J. NELSON.
EXTENSION CAR STEPS.
APPLICATION FILED JULY 31, 1913.
1,098,049.
Patented May 26, 1914.
2 SHEETS—SHEET 1.
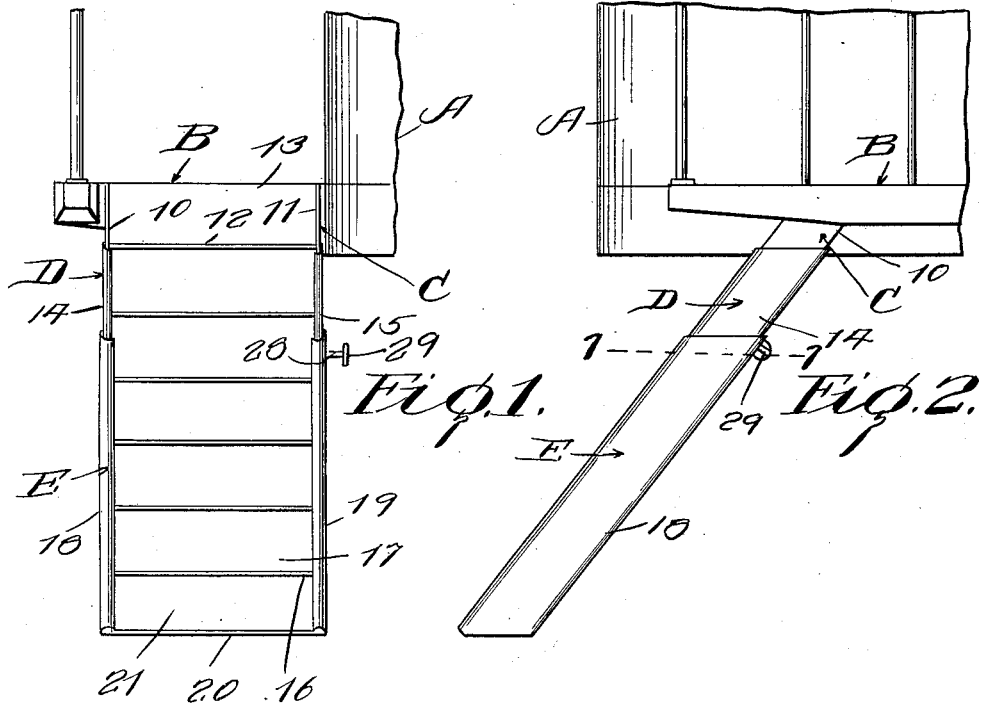
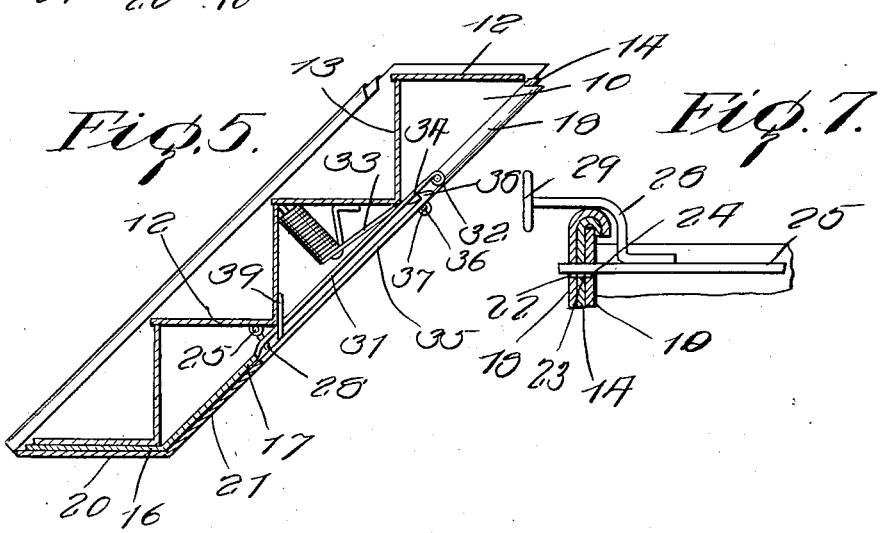

J. NELSON.
EXTENSION CAR STEPS.
APPLICATION FILED JULY 31, 1913.
1,098,049.
Patented May 26, 1914.
2 SHEETS—SHEET 2.
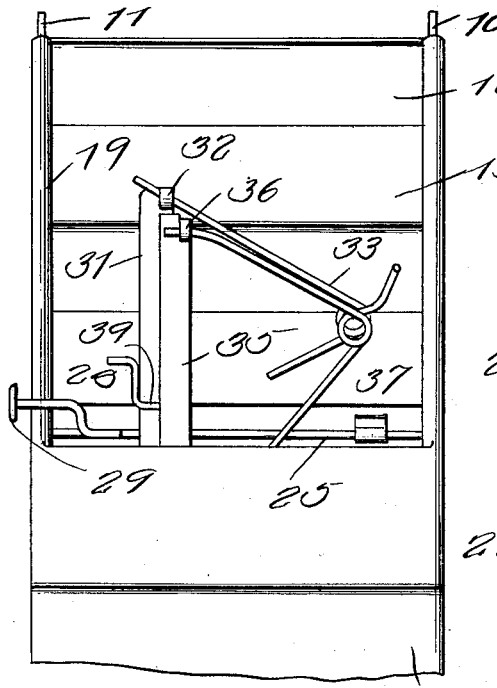
Fig. 3.
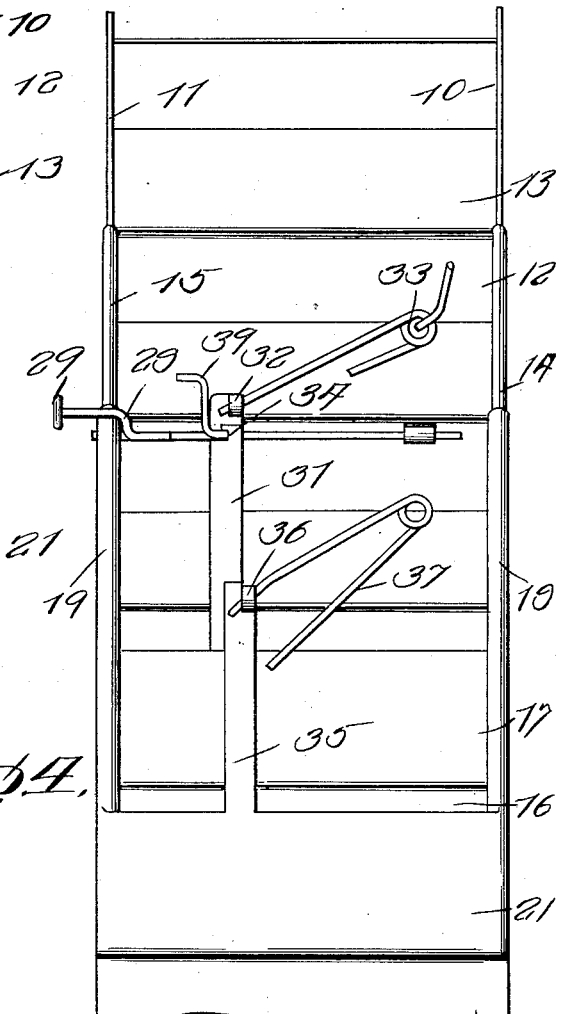
Fig. 4.
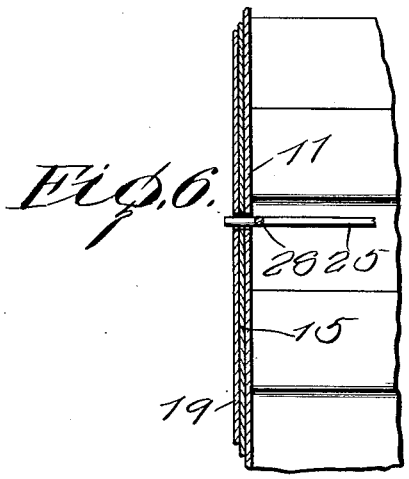
Fig. 6.
Fig. 8.
Witnesses
Inventor
J. Nelson.
By
Attorneys

UNITED STATES PATENT OFFICE.

JOHN NELSON, OF SELAH, WASHINGTON.

EXTENSION CAR-STEPS.

1,098,049.  Specification of Letters Patent.  Patented May 26, 1914.

Application filed July 31, 1913. Serial No. 782,260.

*To all whom it may concern:*

Be it known that I, JOHN NELSON, a citizen of the United States, residing at Selah, in the county of Yakima, State of Washington, have invented certain new and useful Improvements in Extension Car-Steps; and I do hereby declare the following to be a full, clear, and exact description of the invention, such as will enable others skilled in the art to which it appertains to make and use the same.

This invention relates to extension car steps.

The object of the invention resides in the provision of an improved construction of car step whereby same may be lengthened and shortened, the latter condition being resorted to when the car is traveling and the former when the car is at a standstill for the purpose of discharging or taking on passengers.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of one end of a railway car having the invention associated therewith and the extension portion of the steps projected or lowered; Fig. 2 an end view of what is shown in Fig. 1; Fig. 3, a rear view of the invention with the extension steps retracted; Fig. 4, a view similar to Fig. 3 with the extension steps projected; Fig. 5, a longitudinal section of the invention with the extension steps retracted; Fig. 6, a section on the line 6—6 of Fig. 8; Fig. 7, a partial section on the line 7—7 of Fig. 2; and Fig. 8, a transverse section taken on Fig. 4 and looking in the direction of the locking rod.

Referring to the drawings A indicates the body of a car and B the platform thereof. Suspended from the platform B in the usual and well known manner is a fixed flight of steps C which include side members 10 and 11 and foot and rise members 12 and 13 respectively. The invention is further shown as comprising extension step sections D and E. The extension step section D is shown as comprising side members 14 and 15, a foot member 16, and a back member 17. The longitudinal edges of the side member 14 are bent over the longitudinal edges of the side member 10, and likewise the longitudinal edges of the side member 15 are bent over the longitudinal edges of the side member 11 and in this manner the extension step section D is slidably connected to the fixed flight of steps C.

The extension step section E comprises side members 18 and 19, a foot member 20 and a back member 21. The side member 18 of the extension step section E is disposed against the outer side of the side member 14 and has its longitudinal edges bent over the longitudinal edges of said side member 14. The side member 19 is disposed against the outer side of the side member 15 and has its longitudinal edges bent over the longitudinal edges of said side member 15. By this construction it will be apparent that the extension step section E is slidably mounted on the extension step section D. The side members 18, 14 and 10 are provided respectively with openings 22, 23 and 24 which are adapted to be disposed in registration when the sections D and E have been projected to their limit and in which latter position of the sections D and E the foot member 16 will be disposed in spaced relation to the lower foot member 12 and the foot member 20 in spaced relation to the foot member 16.

Slidably mounted on the under side of one of the foot members 12 is a transversely disposed locking rod 25 one end of which is slidable in the opening 24 of the side member 10. This locking rod 25 is provided with a lateral projection 26 against which bears a leaf spring 27 which constantly tends to move the rod 25 in the direction of the side member 10 and the corresponding side members of the sections D and E. The rod 25 also has formed integral therewith an angle extension 28 one arm of which extends across the lower edges of the side members 18, 14 and 10 and terminates in an enlarged free end 29 to form a press button for the purpose of moving the rod 25 against the influence of the spring 27. The rod 25 also has formed integral therewith a trip finger 30 for a purpose that will presently appear. Secured to the back member 19 of the section D is an arm 31 which extends longitudinally of the steps and is provided at its extreme outer end with an eye member 32 through which is engaged a spring 33, said spring being suitably mounted on the under side of the fixed flight of steps C. The arm 31 is provided adjacent the eye member 32 with a nib 34 for a purpose that will presently appear. Formed on the back member 21 is an arm 35 which partly overlies the arm 31 and carries at its free end an eye member 36 through which is slidably engaged one end of a spring 37, the other end of said spring being anchored to the back member 17. The arm 35 is provided on its inner face with a nib 38 adapted for coöperation with the nib 34 to lock the sections D and E together for unitary movement in one direction until the nibs 34 and 38 are disengaged from each other by the trip finger 30 as will hereinafter appear. The arm 31 is held against movement away from the fixed flight of steps C by a finger 39 secured to the rear side of one of the rise members 13 and having its outer end bent over said arm 31. Assuming the extension steps D and E to be in retracted position it will be apparent that the nibs 34 and 38 will be disposed in interlocking relation so that as the extension step E is moved to projected position the extension step D will also be moved in unison therewith until the opening 23 moves in line with the locking rod 25 when said rod will pass through the opening 23 and lock the extension step D against further movement. At the same time the trip finger 30 will engage the arm 35 and raise same so as to disengage the nib 38 from the nib 34. The extension step E can then be moved to full projected position as shown in Fig. 4, the locking rod 25 automatically engaging in the opening 24 to secure the extension step E in such projected position. To again move the extension steps D and E to retracted position it is only necessary to push the locking rod inwardly against the influence of the spring 37 when the springs 33 and 37 will operate to automatically move the extension steps D and E to retracted position.

What is claimed is:—

In an extension car step the combination of a fixed flight of steps including side members, a plurality of extension steps each including side members slidably connected with the side members of the fixed flight of steps respectively whereby said extension steps may be projected and retracted, means for effecting travel of the extension steps in unison during initial movement thereof to projected position, means for disconnecting each extension step as it reaches its projected position from the remaining extension steps, means for locking the extension steps against movement when in projected position, and spring means for returning said extension steps to retracted position when said locking means is released.

In testimony whereof, I affix my signature, in the presence of two witnesses.

JOHN NELSON.

Witnesses:
  G. A. Peterson,
  Ida Peterson.

Copies of this patent may be obtained for five cents each, by addressing the "Commissioner of Patents, Washington, D. C."